Figure 1:
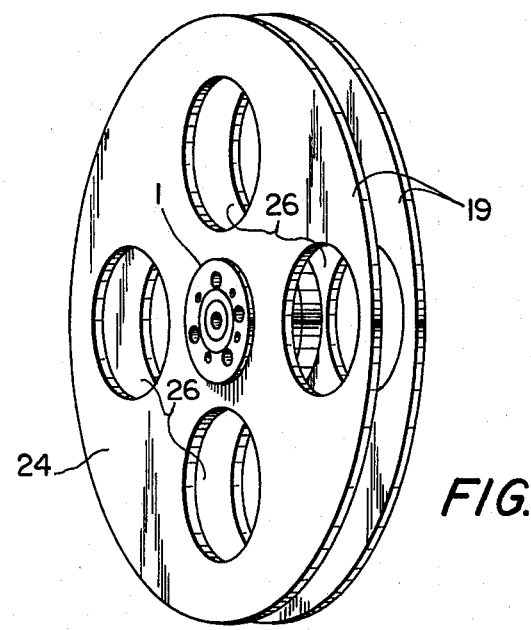

United States Patent [19]

Ruiz-Barbotteau

[11] 4,002,309
[45] Jan. 11, 1977

[54] BOBBIN FOR CINEMATOGRAPHIC FILMS

[76] Inventor: Alejandro Ruiz-Barbotteau, Escobedo Sur 733, Ste. 201, Monterrey, Neuvo Leon, Mexico

[22] Filed: July 10, 1975

[21] Appl. No.: 594,730

[52] U.S. Cl. ............................................. 242/71.8
[51] Int. Cl.² ....................................... B65H 75/18
[58] Field of Search ............ 242/71.8, 71.8 A, 115, 242/116

[56] References Cited

UNITED STATES PATENTS

| | | | |
|---|---|---|---|
| 2,203,101 | 6/1940 | Pausin | 242/71.8 A |
| 3,041,005 | 6/1962 | Wallace | 242/116 |
| 3,211,392 | 10/1965 | Mohr | 242/71.8 A |
| 3,432,113 | 3/1969 | Freedman | 242/71.8 A |
| 3,883,087 | 5/1975 | Praag | 242/71.8 |

Primary Examiner—Edward J. McCarthy
Attorney, Agent, or Firm—Laurence R. Brown

[57] ABSTRACT

A bobbin for films has a center of "Nylon" with two interfitting seat actions and outer side plates loosely enclosing therebetween ratchet panels to rotate therein.

3 Claims, 4 Drawing Figures

U.S. Patent  Jan. 11, 1977  Sheet 1 of 2  4,002,309

BOBBIN FOR CINEMATOGRAPHIC FILMS

The present invention refers to an improved bobbin for cinematographic films, which by means of the new use of the material of which it is manufactured and the combination of the means which make it up avoids the inconveniences of the known bobbins in the cinematographic industry and brings forth advantages as described below.

Said bobbin is characterized by the combination of a floating cube center manufactured of Nylon, by which is attained the new use of the material, in this case Nylon, which gives a novel industrial end product, since up to now the use of Nylon had been ignored as an appropriate material, and advantageous for the manufacture of bobbins for cinematographic films. This floating cube center is itself characterized by the combination of two sections, at which center there exist connecting means which allow these two sections to be solidly joined thus producing the complete center. Likewise said center is characterized by the existence of two sides which loosely encase at the center on the external side of the sections the ratchet panels to be housed firmly at the center, but allowed it to rotate, which would afford as an end result the necessary looseness so that the film does not break at a given moment.

One purpose of the present invention is to avoid the inconveniences resulting from bobbins known to date in the cinematographic industry, which mostly are manufactured of aluminium or of a similar material. Such are very expensive and heavy, result in rough contact between a metal bobbin and the film which is generally celluloid.

The characteristic details of the present invention are shown clearly in the following description and in the drawings which accompany it as an illustration of it and using the same reference symbols to indicate the same parts in the figures shown.

Figure 2:
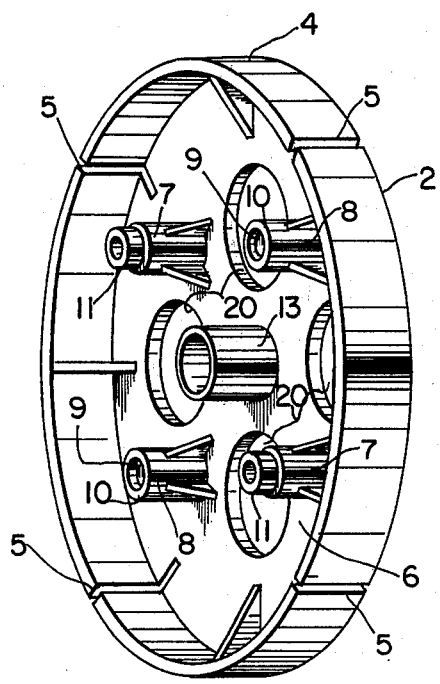
Figure 3:
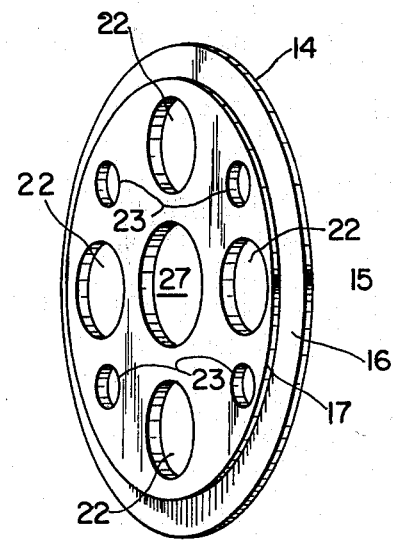
Figure 4:
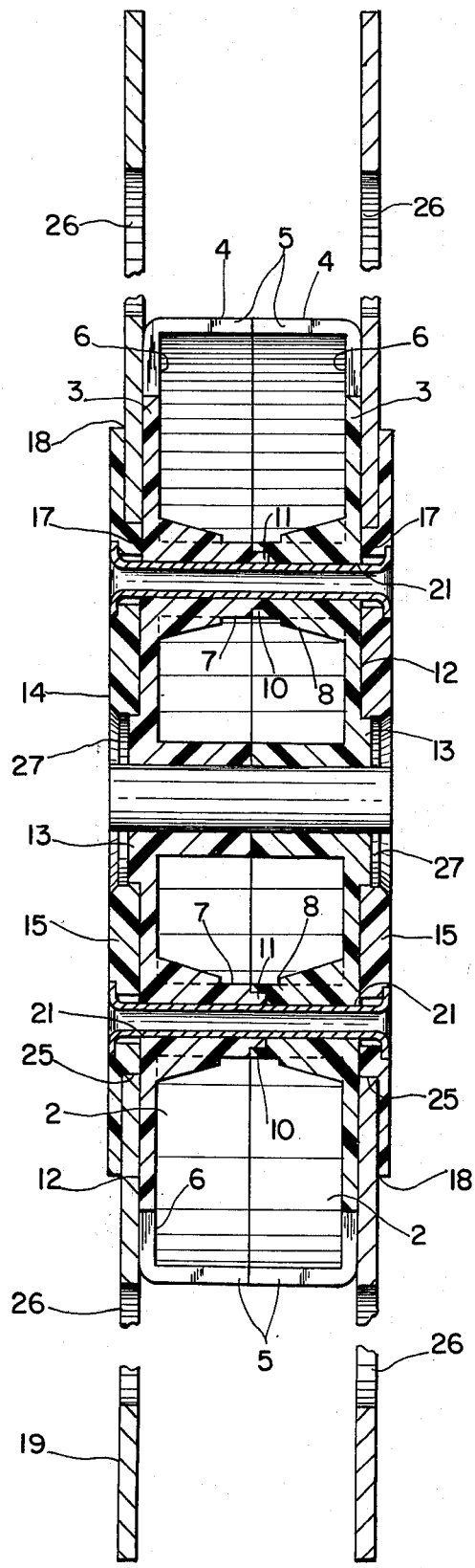

FIG. 1 shows a perspective view of the bobbin.
FIG. 2 shows a perspective view of a section.
FIG. 3 shows a perspective view of a side panel.
FIG. 4 shows a cross section view of the unit ratchet, floating center.

With reference to said figures, this bobbin with a floating center is formed by the combination of a center hub 1 manufactured of Nylon, so that said center 1 is of less weight, will withstand temperature changes without being altered and assure besides not only the proper functioning of the center 1 but also the most appropiate preservation of the film to be rolled in the bobbin. The center 1 is characterized by the combination of two sections 2 each of which is formed by the combination of a side wall 3 and joined to its periphery forming a single unit with a seat 4 which will serve so the film will wind itself over it. The seat 4 has grooves 5 through which the tip of the film passes, thus facilitating the winding of it on the bobbin.

To join one section 2 with another, both sections 2 have in the inner face 6 a joining mechanism made up of two male clasps 7 and two female clasps 8. The male clasps 7 of one inner face 6 shall penetrate into the hollow 9 of the female clasps 8 of the other inner face 6 and be held by means of the pressure from the female clasp 8 mouth 10 around the projection 11 of the male clasp 7. The permanent union of the setions 2 is attained and results in the integration of the spool.

Both sections 2 at their external faces 12 have secondary centers 13 the thickness of which projects the level of the external face 12 so that it is possible to place in position the sides 14 which in turn are characterized by the combination of a secondary body 15 which at its internal face 16 has a separator 17 which produces when the side 14 is in position a crevice 18 into which the ratchets 19 will be housed. A secondary opening 27 receives the secondary center 13 to place in position concentrically with the separator 17.

Both sections 2 have four major holes 20 and four minor holes 21. Also both sides 14 have four secondary major holes 22 and four secondary minor holes 23. The major holes 20 of the sections 2 as well as the minor holes 21 of the sections 2 register with the major secondary holes 22 and minor secondary holes 23 of the sides 14. By means of the major holes (Primary and Secondary 20 and 22) the bobbin is handled freely and through the minor holes (Primary and secondary 21 and 23) are inserted screws, rivets or any other appropriate means of connection, so that the permanent union of the sections 2 and the sides 14 is assured.

The ratchet panels 19 have a central hole 25 of a greater diameter than the sections 2 are formed each by one unit 24 at which center there is a hole 25 whose diameter is greater by millimeters than the diameter of the separator 17, which allows the housing of the separator 17 in the interior of the hole 25 of the unit 24 of the ratchets 19 in such a manner that when placing the ratchets 19 in position, each will be housed in the groove 18. Nevertheless, due to the fact that the thickness of the unit 24 of the ratchets 19 is thinner by millimeters than the cavity for housing the groove 18, the ratchets 19 may rotate freely which would allow the film to unwind without any risk of tearing.

Within the area of the unit 24 of the ratchets 19 there is a series of circular or rectangular visors 26 the purpose of which is preferably to allow an immediate and complete view towards the film which is placed on the bobbin, so that it is possible not only to see the same, but if necessary to have access to that interior to handle the film.

What is claimed is:

1. Improved bobbin structure for films comprising in combination, a pair of film retaining panels defining a central circular aperture, a rotatable center hub of "Nylon" comprised of a plurality of interfitting pieces held in registration to define crevices on opposite sides thereof with two spaced walls held a fixed distance apart greater than the thickness of said panels for receiving thereinto loosely the circular aperture of said panels to rotate on the hub.

2. The bobbin structure of claim 1, wherein the interfitting pieces comprise two registering center hub portions defining a base for winding the film, and two outer plates interfitting therewith to define said crevices.

3. A bobbin structure as defined in claim 2, wherein each of said registering center hub portions have a plurality of projections thereon with respective male and female clasps that register the two portions.

* * * * *